(12) United States Patent
Colletti

(10) Patent No.: US 6,323,865 B1
(45) Date of Patent: *Nov. 27, 2001

(54) AUTOMATIC FONT MANAGEMENT WITHIN AN OPERATING SYSTEM ENVIRONMENT

(76) Inventor: John C. Colletti, 15306 Kercheval, Apt. 4, Grosse Point Park, MI (US) 48230

( * ) Notice: Subject to any disclaimer, the term of this patent is extended or adjusted under 35 U.S.C. 154(b) by 0 days.

This patent is subject to a terminal disclaimer.

(21) Appl. No.: 09/447,135

(22) Filed: Nov. 22, 1999

Related U.S. Application Data

(63) Continuation of application No. 08/764,330, filed on Dec. 12, 1996, now Pat. No. 5,990,907.
(60) Provisional application No. 60/008,788, filed on Dec. 15, 1995.

(51) Int. Cl.[7] .................................................. G06T 11/00
(52) U.S. Cl. ......................... 345/467; 707/542; 358/1.11
(58) Field of Search ........................... 345/467; 707/542; 358/1.11

(56) References Cited

U.S. PATENT DOCUMENTS

| 4,660,999 | 4/1987 | Tsunecki | 400/61 |
|---|---|---|---|
| 5,185,818 | 2/1993 | Warnock | 382/54 |
| 5,200,740 | 4/1993 | Paxton et al. | 340/735 |
| 5,233,336 | 8/1993 | Byron et al. | 340/748 |
| 5,237,313 | 8/1993 | Paxton et al. | 340/735 |
| 5,255,357 | 10/1993 | Byron et al. | 395/151 |
| 5,361,332 | 11/1994 | Yoshida et al. | 395/700 |
| 5,586,242 | 12/1996 | McQueen, III et al. | 395/167 |
| 5,592,595 | 1/1997 | Wakabayshi et al. | 345/415 |
| 5,990,907 | * 11/1999 | Collette | 345/467 |

* cited by examiner

Primary Examiner—Mark Zimmerman
Assistant Examiner—Huedung X. Cao
(74) Attorney, Agent, or Firm—Gifford, Krass, Groh, Sprinkle, Anderson & Citkowski, PC

(57) ABSTRACT

A system and methods automatically provide access and management of installed and noninstalled fonts in a computer system. Installed fonts are resident in computer memory, whereas the noninstalled fonts are preferably described in a compact database including the computer-accessible location of the physical font. Broadly, the invention provides user applications with the capability of automatic selection of both installed and noninstalled fonts without modifications to the application itself.

11 Claims, 2 Drawing Sheets

Format of each family-member-record is:

1. Typeface name terminated by null character.
2. Style name terminated by null character.
3. Font file name terminated by null character.
4. Metrics file name terminated by null character.
5. Master font file name terminated by null character.
6. Volume name (for removable drives) terminated by null character.
7. 4-bytes value of font weight
8. 1-byte value which is not zero if font is italic.

When some field if not set in this table (Volume or Master font file name, etc.) the only null character is presented.
In any case the null character indicates the end of string.
The string might be "zero-length" and contain no other characters but null.

```
offset  length  Value
0       4       Number of records (font families) stored
                in the database
4       4       Physical number of record in the database
                which is logically the first record (last
                used font, etc.)
8       4       Physical number of record in the database
                which is logically the last record.
< record describes one font family >
..........
< record describes one font family >
```

Format of each family-record is:

```
offset  length  Value
0       4       Physical number of next logical record
4       4       Physical number of previous logical record
8       4       Font Type
12      2       Length of this record
14      2       Number of fonts-members of this family
16      ?       Family name, terminated by null character
< record describes one family member >
........
< record describes one family member >
```

*Figure - 2*

AUTOMATIC FONT MANAGEMENT WITHIN AN OPERATING SYSTEM ENVIRONMENT

REFERENCE TO RELATED APPLICATION

This application is a continuation of Ser. No. 08/764,330 filed Dec. 12, 1996, U.S. Pat. No. 5,990,907 and also claims priority of U.S. provisional application Serial No. 60/008,788, filed Dec. 15, 1995, the entire contents of which are incorporated herein by reference.

FIELD OF THE INVENTION

This invention relates to improvements in computer systems and, more particularly, to a system and methods for automatically managing fonts in an operating system environment.

BACKGROUND OF THE INVENTION

In practice, software application programs typically assign fixed fonts to a document created within that application. Later, in the process of editing and/or printing, these fonts are requested from the operating environment and applied to the document. In some cases, however, a particular font may not be available as requested, in which case the operating system may automatically substitute what it considers to be a suitable alternative. Frequently, however, the substituted font looks sufficiently different from the requested font to be unacceptable to the user.

A requested font may be unavailable for several reasons. For example, a user may uninstall seldom-used fonts in an effort to conserve system resources. Alternatively, the document containing the unavailable font may have been received from another user to whom the font was available. In such circumstances, increasing the selection of fonts available to a user, without requiring the actual installation of such fonts in the operating environment in advance, would improve the user's chances of seeing the document in its original format without unnecessary consumption of system resources. In general, automatic management of such a font selection process, where possible, would be preferable to existing techniques.

SUMMARY OF THE INVENTION

Broadly, this invention provides a font user with automated access to a wider range of fonts than those actually installed in the computer system at a particular instant in time. Another objective of the invention is to provide such functionality without requiring modification to the user's application programs. Accordingly, the invention allows a number of fonts to be "virtually installed," that is, to be made available to the user even if unrecognized by the operating system, so that no additional memory is consumed by the virtually installed fonts.

An embodiment of the invention substitutes its own functionality for portions of the operating system to accomplish these objectives. In an operating environment wherein the invention is not installed, an application desiring font information typically initiates functionality (e.g., makes a function call) to the operating system or a related software module to obtain such information. In an operating environment having an embodiment of the invention installed, the same application attempts to initiate the same functionality, but because of the functionality substitution, the request is received by the embodiment, which processes these application's request with the enhanced capability of handling the virtually installed fonts.

BRIEF DESCRIPTION OF THE DRAWINGS

FIG. 2 is a depiction of a font database used to designate uninstalled fonts available to the font manager in an embodiment of the invention.

DETAILED DESCRIPTION OF THE PREFERRED EMBODIMENTS

Figure 1:
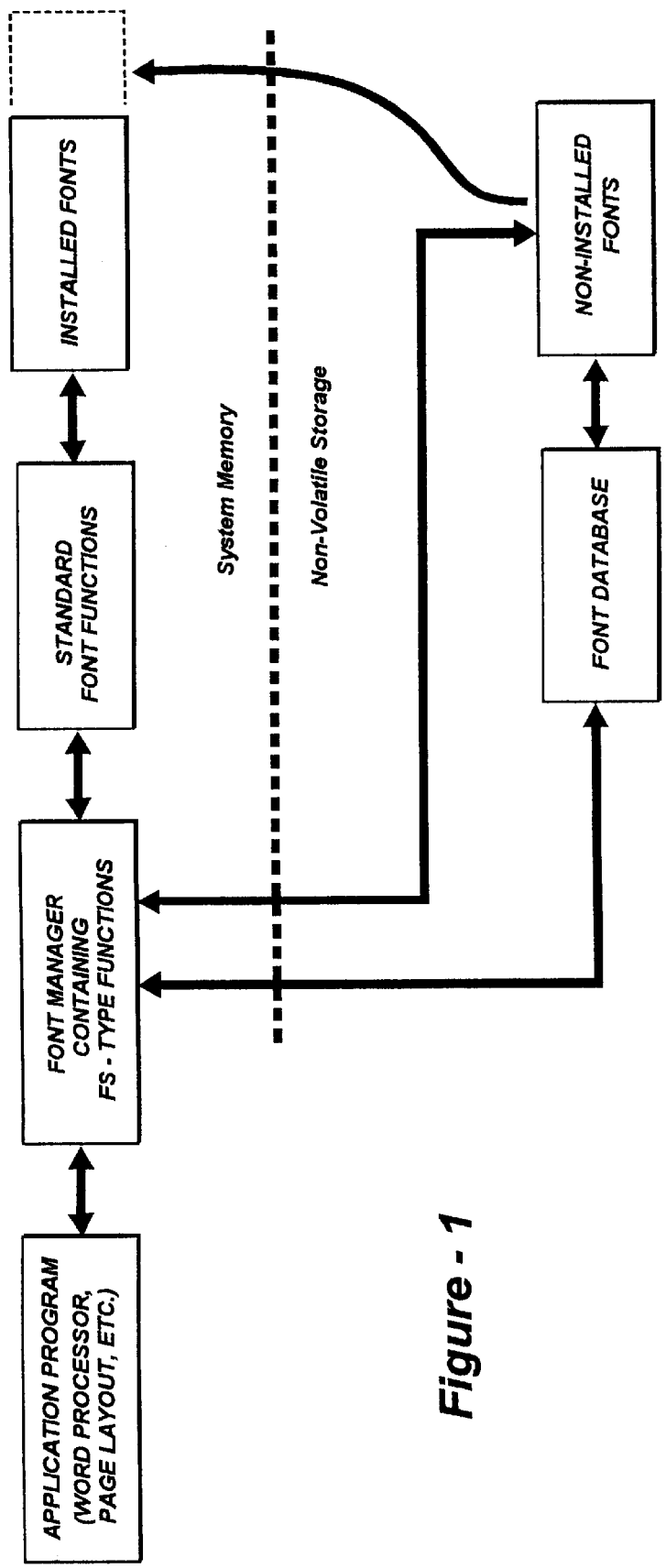
FIG. 1 is a block diagram depicting major components of an embodiment of the invention.

The instant invention is preferably practiced as a specialized software program mechanism, adapted to function within an operating system environment. Broadly, the system monitors the fonts requested by a particular application during execution. In practice, an application typically assigns fixed fonts to the documents created within that application. Later, in the process of editing and/or printing, these fonts are requested by an application in a manner defined by the operating environment. When installed, an embodiment of the invention is invoked by this request, providing the application with access both to installed fonts (i.e., fonts actually residing in system memory) and noninstalled fonts (i.e., fonts not residing in system memory but located in a nonvolatile storage device, such as a hard disk, a CD-ROM, or a floppy disk). The noninstalled fonts may also be located remotely according to the invention, such as on another computer system or peripheral located on a network.

Typically, each font or font family of a particular name, for example "Times Roman" or "Helvetica," is generally contained in a data file or set of data files which describe the letterforms and character metrics of the particular font. For purposes of this description, the process of "installing" such fonts for use by an application program includes the steps of identifying and reading-in the appropriate file(s) in order to use the data contained therein to accurately render the letterforms and character metrics of the font.

In a preferred embodiment, the invention is implemented as a font manager, written in the C-programming language to interface with applications running in Microsoft Windows 3.X®. The native font handling functionality in Windows 3.X is provided by Dynamically Loadable Libraries (DLLs) provided with the Windows operating system. DLLs may contain both functions and data, and a single instance of a DLL may be shared among several modules. The functions and data may be accessed by an application through Application Program Interface (API) calls, which are defined by Microsoft.

When an application loads, a dynamic loader function determines the DLLs required by the application program. The dynamic loader function loads any required DLLs that have not yet been loaded, and then assigns the addresses of the DELL functions corresponding to the API calls referred to by the application into the import table of the application. The application uses these addresses when calling DLL functions.

In this embodiment, the font manager begins execution and substitutes addresses for its own function in the export table of the graphical device interface or GDI, causing some of the font manager's function addresses to be loaded into the application instead of those of some of the standard API functions. In addition, the font manager records the function addresses of the corresponding native DLL functions for future use.

When the application requires a font, for example, to display text on a display screen, it first calls a standard Windows API function, CreateFont, to create a data structure for a logical font. The program then calls the Windows API function, GetDC, to access a device context. To complete the font selection process, the application calls the Microsoft Windows API function, SelectObject, to accomplish mapping the logical font, obtained from CreateFont, to a physical font required for the selected display context. This entire process, from CreateFont to the physical font mapping inside the DC, encompasses the complete process enabling an application to utilize a font.

In a system in which the font manager is executing, as illustrated in FIG. 1, the address in the application's export table pointing to the CreateFont function is replaced with an address pointing to a replacement function provided in the font manager. In the drawing, the application communicates with the font manager through addresses to the replacement functions. For the purposes of this description, the replacement for CreateFont is called FSCreateFont. FSCreateFont first calls the CreateFont function (illustrated as one of the "Standard Font Functions" in the FIG. 1) to process the request using installed fonts, and then evaluates the return value of CreateFont to determine whether the requested font was found from the set of installed fonts. If so, FSCreateFont returns that font to the calling application. In an alternative embodiment, to facilitate faster operation, the original CreateFont call may be delayed pending an actual determination of font availability.

If the requested font is not available in memory, that is, is not installed, FSCreateFont then queries a font database to determine if a font having the same name as the missing font is available but not installed. If this font is identified in the database and exists elsewhere in the system or in some other location accessible by the system, FSCreateFont installs the font in memory and return the logical font to the application. In the drawing, this is shown by the arrow to the dotted-line extension to the "installed fonts" block. In cases where FSCreateFont installs a previously unavailable font into system memory, the subsequent call by the application to SelectObject successfully maps the logical font to the newly installed physical font. This process gives the application access to all installed fonts and to a potentially large set of noninstalled fonts, identified in the font database. A similar function address substitution, accompanied by an analogous functionality substitution, also exists for Windows API function, CreateFontIndirect.

The font manager also substitutes new functions and code for the standard Windows API functions, EnumFonts, EnumFontFamilies, and EnumFontFamiliesEx. The original EnumFonts-type family of functions activate a traversal list of installed fonts, transmitting to the user the parameters of the next available font. FSEnumFonts, provided by the font manager, initially calls the original EnumFonts to initiate a list of installed fonts, and then, when all installed fonts are exhausted, FSEnumFonts proceeds to supplement this list with additional fonts defined in the font database. Meanwhile, the user's program is unaware that it has received more than a list of just the installed fonts, and it continues its processing using the list of both installed and noninstalled fonts. Analogous functionality is provided by the font manager when the application calls any of the original family of EnumFonts-type functions.

Three other API function substitutions may bes required to fully implement the font manager. These functions are LoadLibrary, LoadLibraryEx, and GetProcAddress. The FSLoadLibrary and FSLoadLibraryEx functions perform all necessary API-intercepting for newly loaded modules, that is, they substitute font manager function addresses in any newly loaded module that calls a substituted API function. The original GetProcAddress function returns addresses of any function accessed by the application. FSGetProcAddress returns the standard API functions except that it returns function addresses in the font manager for any intercepted API functions.

In a second embodiment, the font manager is implemented in a 32-bit Microsoft Windows environment. Rather than altering the assignment of function addresses in the export table of an application via the dynamic loader function, this embodiment attaches itself to the process memory space of the application. To accomplish this, the font manager utilizes a "hook technique," which imports fort manager function addresses into user applications. The embodiment uses two component modules to implement this hook technique. The first component is a main module and the second component is a hook DLL. Whenever the program is initiated, the main module initializes and creates a system wide hook using the "creating top level window" event as the hook event. The hook DLL is associated with the hook event such that the hook DLL is executed on every subsequent occurrence of the hook event. The main module then returns to a waiting state, responding primarily to messages from the hook DLL.

Whenever an application creates the top level window in the system, the Windows operating system calls the hook procedure located in the hook DLL. The effect of this call is that the DLL with the hook procedure is loaded into the process memory of the application. The hook DLL is initialized by a call to its initialization routine. The initialization routine determines which API functions must be intercepted by the font manager. This "interception" is accomplished by modifying the API addresses in the import tables of the application. Whenever the application attempts to call one of the intercepted functions it actually calls the address to the substitute function in the font manager. In addition, the original function addresses that existed in the export table of the application are recorded by the fort manager and preferably used to process requests on installed fonts. Note that the functions intercepted in the 32-bit Windows environment, in this embodiment, are the same as the functions intercepted in the Windows 3.X embodiment. Furthermore, in the 32-bit Windows environment, an embodiment processes a font request from an application using the same methods described Windows 3.X embodiment.

When the font manager cannot completely satisfy the request from an application using installed fonts, it will access the database of other available fonts in an attempt to satisfy the request. In a preferred embodiment, the database is constructed to be as compact as possible. The format of the database is depicted in FIG. 2.

The invention is not limited to use in the Microsoft Windows environments, but may be implemented in any operating system which may benefit from the procedures described above.

What is claimed is:

1. In a computer system having a memory capable of containing one or more installed fonts and nonvolatile storage means, a font management method comprising the steps of:

providing a noninstalled font in the nonvolatile storage means;

providing a font database containing information relating to one of the noninstalled fonts;

receiving a request for a desired font;

searching in the memory for the installed font corresponding to the desired font; and if the search for the installed font fails, searching the font database for the noninstalled font corresponding to the desired font, and, if the search for the noninstalled font succeeds, satisfying the request with the noninstalled font.

2. The method of claim 1, wherein the step of satisfying the request with the noninstalled font is accomplished by installing the noninstalled font into the memory.

3. The method of claim 1, wherein the step of satisfying the request with the noninstalled font is accomplished by including the noninstalled font into a list which is returned to an application program.

4. The method of claim 1, wherein the desired font is specified by name in the request.

5. The method of claim 1, wherein the desired font is included in a list of available fonts.

6. The method of claim 1, wherein the font database contains information as to the location of the font.

7. In a computer system having a memory capable of containing installed fonts and non-volatile storage means, a font management system comprising:

at least one noninstalled font located in the nonvolatile storage means;

a font database including information relating to the noninstalled fonts; and a font management program capable of performing the following functions:

receiving a request for at least one desired font, searching in the memory for the installed font corresponding to the desired font, and if the search for the installed font fails, searching the font database for the noninstalled font corresponding to the desired font, and if the search for the noninstalled font succeeds, satisfying the request with the noninstalled font.

8. The system of claim 7, wherein the font management program satisfies the request by installing thus noninstalled font into the memory.

9. The system of claim 7, wherein the font management system satisfies the request by including these noninstalled font in a list returned to an application.

10. The system of claim 7, wherein the information relating to the noninstalled fonts includes the location of the non-installed fonts.

11. The system of claim 7, wherein the information relating to the noninstalled fonts includes a description of the non-installed fonts.

* * * * *